Figure 1:
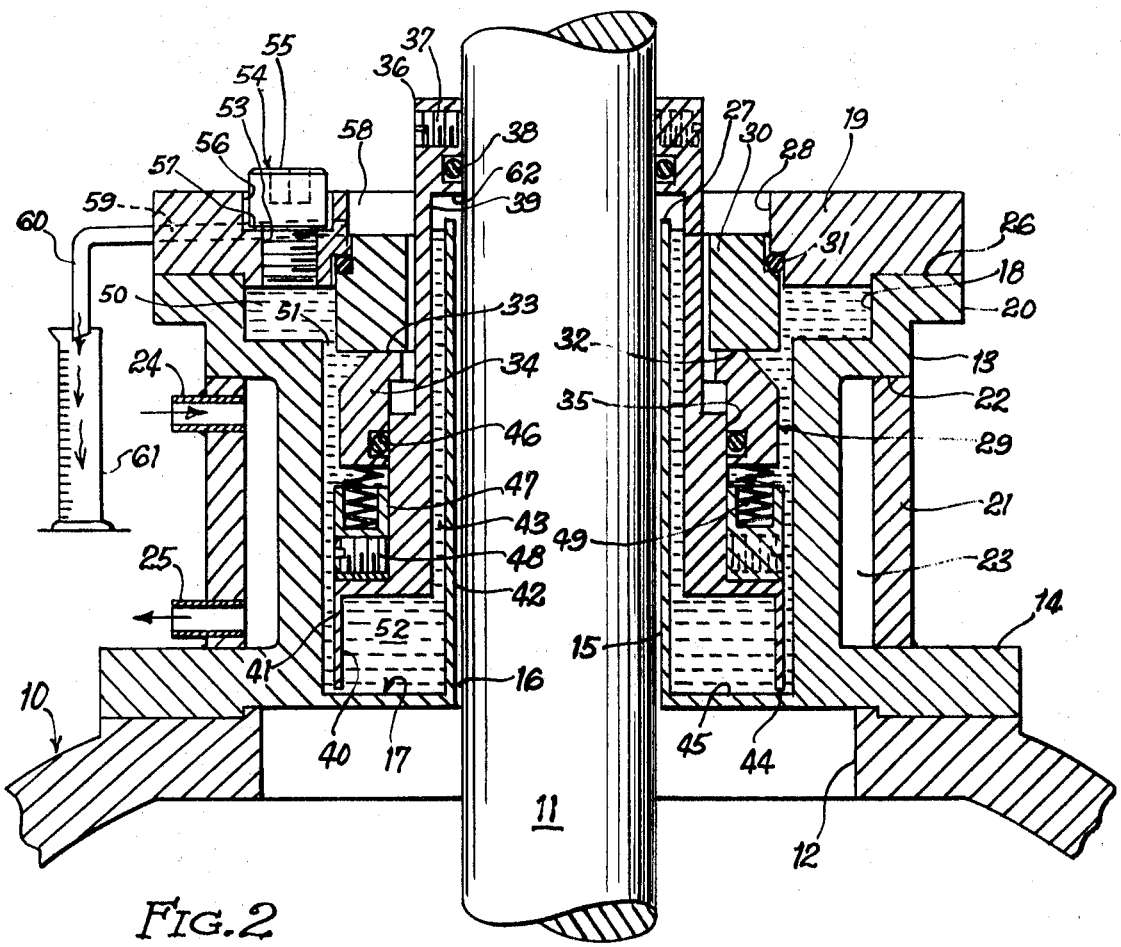
Figure 2:
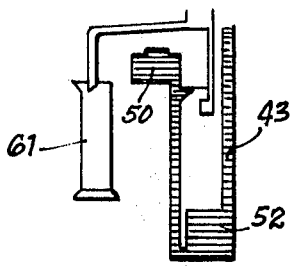

United States Patent

[11] 3,589,737

| [72] | Inventor | Joseph Sedy<br>Skokie, Ill. |
|---|---|---|
| [21] | Appl. No. | 799,637 |
| [22] | Filed | Feb. 17, 1969 |
| [45] | Patented | June 29, 1971 |
| [73] | Assignee | Crane Packing Company<br>Morton Grove, Ill. |

[54] MECHANICAL SEAL FOR A VERTICAL ROTATING
10 Claims, 6 Drawing Figs.

[52] U.S. Cl. .................................................... 277/17,
 277/2, 277/74
[51] Int. Cl. ...................................................... F16j 15/16,
 F16j 15/40
[50] Field of Search ........................................... 277/2, 17,
 18, 74

[56] References Cited
UNITED STATES PATENTS

| 1,930,756 | 10/1933 | Heath et al. ................. | 277/74 |
| 2,485,537 | 10/1949 | Rae, Jr. ....................... | 277/17 |
| 2,667,348 | 1/1954 | Frye et al. .................... | 277/17 |
| 3,260,530 | 7/1966 | Jelatis et al. ................. | 277/2 |

*Primary Examiner*—Samuel Rothberg
*Attorney*—Charles F. Voytech

ABSTRACT: A sealing arrangement for a vertically disposed shaft for a gas under pressure in a reactor or the like wherein a single rotary seal is used, preferably of the end face type, with a fixed quantity of lubricant for the seal pressurized by the gas. The lubricant is held by the gas at the seal faces even through leakage of the lubricant occurs across the faces and the quantity is therefore continually diminishing. Means are provided for measuring the quantity of escaped lubricant to determine when the supply of lubricant should be replenished to avoid dry running of the seal.

PATENTED JUN 29 1971

3,589,737

INVENTOR
Joseph Sedy
by Charles J. Ungehr
Atty

MECHANICAL SEAL FOR A VERTICAL ROTATING

This invention relates generally to mechanical shaft seals and to the provision of simplified and improved means for sealing substantially vertically disposed, rotating shafts to eliminate the escape of gaseous fluids along the shaft past an opening in a housing through which the shaft extends. More specifically, this invention relates to an improved sealing arrangement of greatly simplified design, especially suitable for high-pressure vessels used to house reactors as well as products of toxic or dangerous nature.

It is an object of this invention to provide an improved lubricated mechanical seal arrangement for vertical shafts passing through a wall of a vessel of pressurized gas which absolutely eliminates leakage of gas along a rotating shaft, requires no auxiliary pumping equipment for lubricant, and occupies a minimum of space.

It is another object of this invention to provide a lubricated single gas seal which will perform reliably under large pressure variations and whether or not the shaft is rotating.

It is another object of the invention to provide a lubricated single gas seal for a vertical shaft which does not require any basic changes in shaft and housing design.

These objects are achieved in a sealing arrangement which generally comprises a vessel adapted to contain a pressurized fluid, the vessel having a vertical rotatable shaft member extending through an opening in said vessel. A tubular chamber is formed concentrically around the shaft by a tubular flanged member attached to the vessel around the shaft, said tubular chamber comprising an annular recess in said member and arranged to contain a liquid lubricant. A sleeve secured concentrically upon the shaft extends into the annular recess and into the liquid lubricant therein to create a liquid trap for preventing gas from entering between the relatively rotating faces of a rotary mechanical seal mounted on the sleeve. An apertured end plate is mounted concentrically and upon the tubular flanged member and is provided with means for introducing liquid lubricant to the inside of the annular recess. Preferably, the inside wall of the annular recess will extend above the highest level of lubricating liquid in the recess so that the liquid level will always be below the upper edge of the inside wall of said annular recess, thus preventing liquid from spilling over said inside wall into the vessel while the annular recess is being filled with liquid lubricant.

The foregoing and other objects and advantages will be apparent from the following detailed description of a preferred embodiment of the invention when taken in conjunction with the accompanying drawings in which FIG. 1 is a partial vertical cross-sectional view of a pressure vessel and a vertically disposed rotating shaft passing therethrough and provided with a sealing arrangement embodying this invention; and FIGS. 2—6 are schematic diagrams showing sequentially the manner in which liquid lubricant is maintained at the relatively rotating faces of a mechanical seal even after a considerable amount of liquid has leaked through the mechanical seal.

Referring now to FIG. 1 for a detailed description of a preferred embodiment of the invention, there is shown a vessel 10 which may be a housing or tank, containing a fluid under pressure. The fluid may be a gas which must be prevented from escaping from vessel 10. Said vessel is provided with a shaft 11 extending through an opening 12 provided in the vessel for that purpose and mounted for rotation about a vertical axis. Opening 12 is closed by a tubular casing 13 which is provided with an attaching flange 14 by which it is centered upon and fastened to vessel 10. A central opening 15 in casing 13 is of slightly greater diameter than the diameter of shaft 11 to provide an annular space 16 between the casing and shaft. An annular recess 17 is formed in casing 13, said recess extending downwardly from the top of casing 13. A counterbore 18 is formed in the upper end of casing 13 for a purpose hereinafter to be described. An end plate 19 closes off counterbore 18 and a portion of the recess 17 and is secured by bolts or other known fasteners (not shown) to an attaching flange 20 provided for that purpose in casing 13.

A chamber for circulating coolant around casing 13 is formed by welding a tubular element 21 to flange 14 and to the shoulder 22 formed in the upper end of casing 13 by the enlargement of the casing in which counterbore 18 is formed. The coolant chamber is shown at 23, and tubular element 21 is provided with inlet and outlet pipes 24 and 25, respectively, through which the coolant may enter and leave the chamber.

The upper radial surface 26 of flange 20 is disposed below the upper surface 27 of tubular casing 13 at shaft 11. Said shaft 11 passes through an opening 28 in end plate 19, and it is this opening between end plate 19 and shaft 11 which must be sealed in a manner to prevent the escape of the contents of vessel 10.

The means for effecting a seal between shaft 11 and end plate 19 is a rotary mechanical seal shown generally at 29. Seal 29 is of a type capable of withstanding the pressures, temperatures and speeds to be encountered in the normal operation of the device of which shaft 11 and vessel 10 are parts. In the form selected to illustrate this invention, rotary mechanical seal 29 is comprised of a stationary seat washer 30 appropriately mounted on, and sealed with respect to, end plate 19 by a resilient deformable ring 31, preferably of the O-ring type. Said seat washer 30 has a lapped radial face 32 against which bears the lapped radial face 33 of a sealing washer 34 to provide a fluidtight rotating seal between washers 30 and 34. Said washer 34 is in turn mounted on a first step 35 of a sleeve 36 secured to shaft 11 for rotation therewith by one or more setscrews 37. An O-ring 38 provides a seal between shaft 11 and sleeve 36.

The interior of sleeve 36 is formed with a first counterbore 39 extending over the central region of the sleeve and a second counterbore 40 which is disposed in a second step 41 in sleeve 36. The formation of recess 17 in tubular casing 13 resulted also in the formation of a sleeve 42, the outside diameter of which is smaller than the internal diameter of first counterbore 39 in sleeve 36, so that an annular space 43 is formed between sleeve 36 and sleeve 42 of the tubular casing. The location of sleeve 36 on shaft 11 is so selected that the bottom surface 44 of the sleeve is spaced slightly above the bottom surface 45 of recess 17. The upper end 62 of the first counterbore 39 in sleeve 36 is above the upper surface 27 of the tubular casing. Thus communication is established from annular space 16 located between shaft 11 and casing 13 around surface 27 into annular space 43 located between sleeve 36 and sleeve 42, and then around bottom surface 44 on sleeve 36 to the outside of said sleeve. It is contemplated that the maximum diameter of the end step 41 and of any part of the seal mounted on sleeve 36 will be slightly less than the outer diameter of the recess 17, so that communication will continue around the outside of the sleeve and seal.

The remainder of the rotary mechanical seal 29 is comprised, in the form selected to illustrate this invention, of a resilient deformable sealing element such as an O-ring 46 disposed between sealing washer 34 and intermediate step 35. A spring retainer 47 in the form of an annular machined element is secured to intermediate step 35 of sleeve 36 by one or more setscrews 48 for rotation with sleeve 36. A plurality of springs 49 is retained in appropriate recesses in spring retainer 47 and compressed between said retainer and sealing washer 34 to cause the latter to bear continuously against seat washer 30. It is understood that other forms of rotary mechanical seals may be used in place of the one just described, if desired or made necessary by special conditions of heat, pressure, and velocity of the rotating part.

It may be noted that seat washer 30 forms with counterbore 18 in tubular casing 13 an upper reservoir 50 for a seal lubricating liquid, such as oil or the like, and that said reservoir is in communication, through the interior of a space 51 between seat washer 30 and the wall of recess 17, with the interior of recess 17 in which sleeve 36 and its connected rotating portion of rotary mechanical seal 29 rotates. It may be noted further that second counterbore 40 in sleeve 36 forms with recess 17 a second or lower reservoir 52 which in turn is in communication through annular space 43, around upper surface 27 of tubular casing 13, with the annular space 16 between shaft 11 and tubular casing 13. It may be remembered that space 16 is filled with the contents of vessel 10 which it is desired to keep from escaping from said vessel.

Lubricant is introduced into the reservoir 51 and thence into recess 17 through a fill opening 53 in end plate 19, said fill opening normally being closed by a threaded plug 54 having a head 55 which requires an enlargement 56 of the opening 53 to provide a recessed setting for plug 54. The bottom surface 57 of the enlargement 56, however, is designed to be below surface 27 of tubular element 13, so that as the reservoir 51 and recess 17 are filled with the lubricant, the spilling of the lubricant over into the space 16 and along the shaft into vessel 10 may be prevented by stopping the filling operation when the level of the lubricant reaches bottom surface 57.

It is anticipated that there will be a slight leakage of lubricant between faces 32 and 33 on washers 30 and 34, respectively, as these surfaces are lubricated. Such leakage would accumulate in the space between sleeve 36 and washers 30 and 34, and would eventually rise beyond washer 30 into the opening 28. It may be noted that washer 30 does not extend upwardly to the top of plate 19 but terminates a short distance therefrom to leave an annular recess 58 in which the leakage can accumulate. It is desirable to measure the amount of leakage to obtain an indication of the amount of lubricant remaining in recess 17. Accordingly, a passage 59 is formed in end plate 19 to conduct the leakage from recess 58 through a tube 60 into a container 61 which is preferably in the form of a graduated glass cylinder, so that the quantity of leakage can be measured. The minimum quantity of lubricant needed for safe operation can be determined experimentally.

Figure 3:
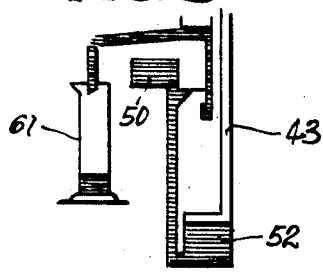
Figure 4:
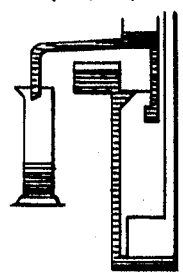

The operation of the device is as follows:

Assuming that upper and lower reservoirs 51 and 52 are filled with lubricant, as well as the annular space 43 and the space surrounding the exterior of sleeve 36, and assuming further that plug 54 is securely in place in fill opening 53, the operation of the device turned by shaft 11 will cause a relative rotation between sleeve 36, including the rotating portion of rotary mechanical seal 29, and seat washer 30. The contents of the vessel presumably will be under working pressure, and assuming that the contents are a gas, said gas under pressure will then be present at the top of the lubricant in space 43. The gas pressure will be transmitted through the lubricant equally and in all directions to all parts of the device contacted by the lubricant. Thus the lubricant will be urged between the faces 32 and 33 of the seat washer 30 and sealing washer 34 respectively to lubricate said faces. This condition is shown schematically in FIG. 2. As leakage through the seal faces occurs, the fixed quantity of lubricant in annular space 43 will be diminished and replaced by gas under pressure. This is shown in FIG. 3. The leakage passes through passage 59 in end plate 19 and through tube 60 into container 61. After the lubricant in the space 43 is exhausted the lubricant in lower reservoir 52 will then be forced outwardly and collected in container 61. Meanwhile the lubricant is still present at the seal faces 32 and 33 and performing its lubricating function. This is illustrated in FIG. 4.

Figure 5:
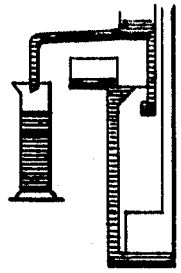
Figure 6:
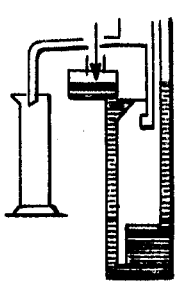

When all of the lubricant in lower reservoir 52 is exhausted, gas will begin to escape around the bottom surface 44 into the space around the outside of sleeve 36, and because the gas is lighter than the lubricant it will simply bubble through the space and up into the upper reservoir 50. The gas in upper reservoir 50 will displace the lubricant, but the lubricant still is present between the faces 32 and 33, as shown in FIG. 5. Meanwhile the operator, by observing the level of the leakage in container 61, determines that a maximum quantity of lubricant consistent with safe operation of the seal has been expelled and that it is necessary to replenish the lubricant in the upper and lower reservoirs and in the annular space 43. The equipment is then shut down, plug 54 is removed, and the lubricant, either from container 61 or from a fresh supply, is poured into the fill opening 53 until it reaches the level of bottom surface 57 of the fill plug enlargement 56.

Any heat generated by the seal is transferred to the tubular casing and from there to the coolant circulating in chamber 23 surrounding the sealed chamber. Thus by the foregoing sealing arrangement only one rotary mechanical seal is required to seal a gas as contrasted with the double seal and pressurized lubricant chamber normally recommended for this service. Adequate provision is made for supplying lubricant to the seal faces at all times, and although a fixed quantity of lubricant is used, its depletion through leakage may be observed at all times so that when it appears that the level of the lubricant will approach the seal faces, that fact is immediately made known to the operator, who can then take steps to replenish the supply. No extra pump is needed to pressurize the lubricant, the pressure of the fluid in the vessel being applied directly to the lubricant for this purpose. The use of a sleeve with a step formed thereon makes possible the use of a balanced rotary mechanical seal, so that any of the pressures normally encountered in mixers or other devices having vertical shafts can be safely accommodated.

It is understood that the foregoing description is merely illustrative of a preferred embodiment of the invention and that the scope of the invention is not to be limited thereto but is to be determined by the appended claims.

I claim:

1. In combination a substantially vertically disposed shaft, a housing having an opening through which the shaft extends, a rotary seal having relatively rotatable parts for sealing the space between the shaft and housing, and a supply of lubricant for the seal, said supply comprising means on the housing defining an upper reservoir of lubricant disposed above the seal, means on the housing defining a lower reservoir of lubricant disposed below the seal, said housing being radially spaced from the seal and defining an annular chamber connecting the bottoms of the upper and lower reservoirs, said annular chamber being filled with said lubricant, said seal being disposed in said annular chamber and exposed on one side to the lubricant therein, and means communicating the top of the lower reservoir with the space forming the interior of the housing.

2. A combination as described in claim 1, characterized in that the seal is a rotary mechanical seal, there being a sleeve secured to the shaft and extending downwardly between the upper and lower reservoirs, said rotary mechanical seal having a rotary part and a stationary part, the rotary part of the rotary mechanical seal being mounted on the sleeve and having a radial face in running sealing contact with the stationary part.

3. A combination as described in claim 1, said first-mentioned means comprising an annular recess in the housing concentric with the opening therein, said second-mentioned means comprising a sleeve secured to the shaft and extending into the annular recess to define with the annular recess at the lower end of the sleeve the lower reservoir, said seal being a rotary mechanical seal, said relatively rotatable parts comprising a rotary part and a stationary part the rotary part of the rotary mechanical seal being mounted on the sleeve and having a radial face in running sealing contact with the stationary part.

4. A combination as described in claim 3, said sleeve having a counterbore in the lower end thereof defining with the bottom of the annular recess the lower reservoir of lubricant.

5. A combination as defined in claim 3, said sleeve being spaced from the walls of said annular recess and forming with the radial outer and radial inner walls thereof said annular chamber connecting the bottoms of the spaces forming the upper and lower reservoirs and the means communicating the top of the lower reservoir with the space forming the interior of the housing.

6. A combination as defined in claim 3, characterized by an end plate secured to the housing over a portion of the recess, said stationary part of the seal being mounted on said end plate and forming with said end plate a closure for the annular recess, said stationary part forming with said sleeve an annular chamber for collecting leakage from the seal, and means for removing the leakage.

7. A combination as described in claim 1, the interior of the housing containing gas under pressure, the means communicating the lower reservoir with the interior of the housing comprising an annular chamber formed between the sleeve and housing, the level of the lubricant in the communicating means being below the top of said communicating means such that the lubricant is subjected to downward pressure from the gas under pressure in the housing.

8. A combination as described in claim 1, said housing comprising a vessel containing the fluid to be sealed and having an opening through which the shaft extends, and comprising further a tubular casing surrounding said shaft and secured to the vessel, said casing having an annular recess formed therein, a sleeve secured to the shaft and extending into the recess, said rotary seal being mounted on said sleeve, an end plate secured to the tubular casing over said recess, said end plate having an opening therein, said sleeve and seal forming with the recess the upper and lower reservoirs, leakage from the seal accumulating around the sleeve and in the opening in the end plate, and means for collecting and measuring the quantity of leakage.

9. A combination as described in claim 8, said end plate having a fill opening in communication with the upper reservoir, and means in said opening indicating the optimum level of lubricant in the annular recess in the tubular casting.

10. A combination as described in claim 8, said rotary seal having a seat washer, means mounting said seat washer in the opening in said end plate and forming with said opening in the end plate a recess, and said means for collecting and measuring the quantity of leakage comprising a passage through the end plate from the end plate recess to the exterior, and a graduated receptacle for receiving leakage from the passage.

PO-1050
(5/69)

UNITED STATES PATENT OFFICE
CERTIFICATE OF CORRECTION

Patent No. 3589737      Dated June 29, 1971

Inventor(s) Joseph Sedy

It is certified that error appears in the above-identified patent and that said Letters Patent are hereby corrected as shown below:

Title - on title page and in Column 1 - insert "SHAFT" after "ROTATING".

Signed and sealed this 11th day of January 1972.

(SEAL)
Attest:

EDWARD M. FLETCHER, JR.        ROBERT GOTTSCHALK
Attesting Officer              Acting Commissioner of Patents